United States Patent [19]

Kapgan et al.

[11] Patent Number: 5,058,936
[45] Date of Patent: Oct. 22, 1991

[54] METHOD OF FORMING A MECHANICAL

[75] Inventors: Michael I. Kapgan, Foster City; Richard H. Kosarczuk, Fremont, both of Calif.

[73] Assignee: Raychem Corporation, Menlo Park, Calif.

[21] Appl. No.: 315,005

[22] Filed: Feb. 23, 1989

[51] Int. Cl.⁵ .............................................. F16L 19/00
[52] U.S. Cl. .................................. 285/382; 285/382.1; 29/447; 29/521
[58] Field of Search .................... 285/381, 382.7, 382; 29/447, 521

[56] References Cited

U.S. PATENT DOCUMENTS

| | | | |
|---|---|---|---|
| 1,004,270 | 9/1911 | Jahnke | 285/381 |
| 3,150,889 | 9/1964 | Watts | 285/381 X |
| 3,287,034 | 11/1966 | Bragg | 285/381 X |
| 3,484,123 | 12/1969 | van der Velden | 285/341 |
| 3,668,754 | 6/1972 | Boast | 285/381 X |
| 3,805,567 | 4/1974 | Agius-Sinerco | 285/381 |
| 3,889,989 | 6/1975 | Legris | 285/382.7 X |
| 4,147,385 | 4/1979 | van der Velden | 285/382.4 |
| 4,314,718 | 2/1982 | Broyles et al. | 285/382.7 X |
| 4,455,041 | 6/1984 | Martin | 285/381 X |
| 4,805,945 | 2/1989 | Foucault et al. | 285/382.7 X |

FOREIGN PATENT DOCUMENTS 2306784 11/1976 France ................................ 285/381

Primary Examiner—Dave W. Arola
Assistant Examiner—Carol I. Bordas
Attorney, Agent, or Firm—Herbert G. Burkard

[57] ABSTRACT

A technique for making a connection to an object, for example a tube, comprises positioning a shape memory alloy collar around the tube, the collar having two circumferentially extending teeth formed in its internal surface. One of the teeth is caused to bite into the external surface of the tube by heating the collar to cause it to shrink, using the shape memory properties of the alloy. The other tooth is caused to bite into the external surface of the tube by mechanically deforming the collar by drawing a tapered sleeve axially over it. Axial force can be applied to the tube through the collar.

15 Claims, 1 Drawing Sheet

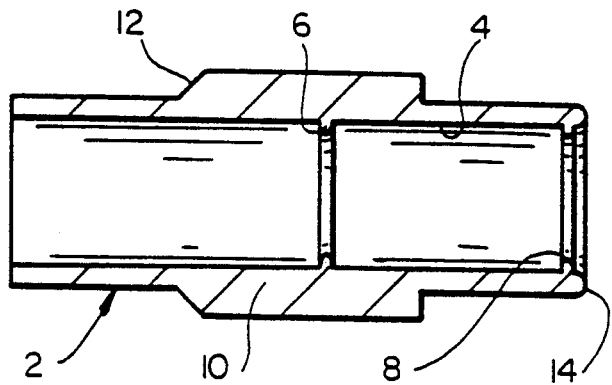
FIG_1
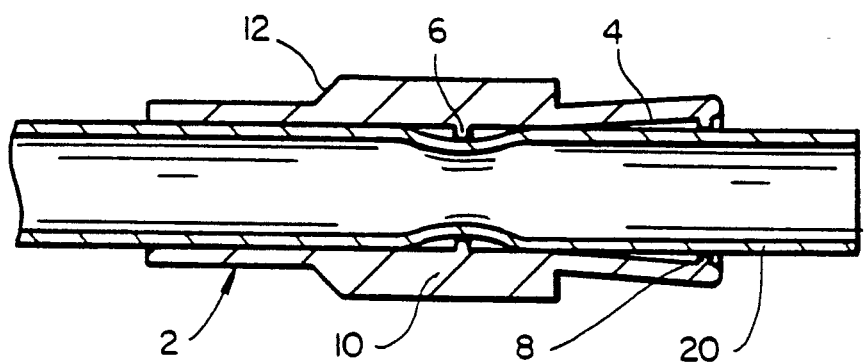
FIG_2
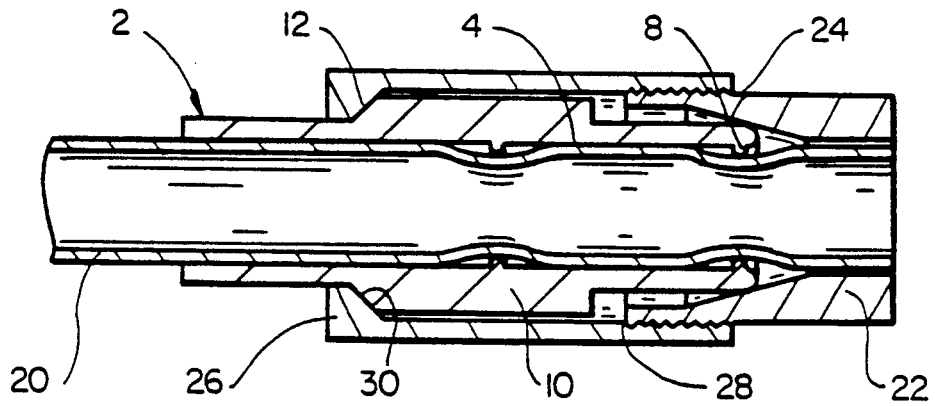
FIG_3

METHOD OF FORMING A MECHANICAL

BACKGROUND OF THE INVENTION

The invention relates to a method of forming a mechanical connection to an object, to an assembly for forming a mechanical connection to an object, and to an object to which a mechanical connection has been made.

It is known to make a mechanical connection to an object by attaching a collar to the external surface of the object, through which a force can be applied to the object in a direction parallel to the surface. This connection technique is used in particular to connect elongate objects which have a constant cross-section to one another, for example tubes (which term shall include pipes) and rods. For example, U.S. Pat. No. 3,484,123 discloses a tube coupling assembly comprising a collar which is rigidly fixed to a first tube by swaging the tube (involving expanding it radially), and a union member which is rigidly fixed to the second tube, also by swaging. The union member extends beyond the end of the second tube and has a threaded external surface. The assembly includes a nut which has a radially inwardly projecting flange at one end which abuts the collar, and which is threaded internally at its other end for engaging the threaded surface of the union member, so that rotation of the nut relative to the union member forces the two tubes towards one another.

More recently, it has been proposed to use a collar formed from a shape memory alloy, in order to avoid the need to swage an object to join the object to the collar. Shape memory alloys exhibit a shape memory effect as a result of their ability to transform between martensitic and austenitic phases. The transformation may be caused by a change in temperature: for example, a shape memory alloy in the martensitic phase will begin to transform to the austenitic phase when its temperature increases to a temperature greater than $A_s$, and the transformation will be complete when the temperature is greater than $A_f$. The reverse transformation will begin when the temperature of the alloy is decreased to a temperature less than Ms and will be complete when the temperature is less than $M_f$. The temperatures $M_s$, $M_f$, $A_s$ and $A_f$ define the thermal transformation hysteresis loop of a shape memory alloy. An article may be formed in a desired configuration while in its austenitic phase. If it is then cooled so that it transforms to the martensitic phase, it can then be deformed by up to about 8%. The strain imparted to the article is recovered when the article is subsequently heated so that it transforms back to the austenitic phase. Further information is available in the article by L. M. Schetky in Scientific American, Volume 241, pages 68 to 76 (1979) entitled Shape Memory Alloys.

The use of a shape memory alloy collar has the advantage that significantly less time and less skill are required on the part of the installer than are required to affix a collar by swaging. Furthermore, the outlay in equipment required to install a shape memory alloy collar is significantly less than that required to install a collar by welding.

It is common for the collar to have at least one groove formed in its internal surface, the or each groove being defined longitudinally by two radially extending circumferential formations. Swaging the object, or heating a shape memory alloy collar to cause it to shrink, to cause the object and the collar to engage one another involves forcing the formations into the external surface of the object, so that a circumferential portion of the object is forced into the groove in the internal surface of the collar. This increases the pressure which the seal between the collar and the object is able to withstand.

The formations may be the end walls of the groove which is formed in the otherwise uniform internal surface of the collar, as in the collar described in US-3484123. Alternatively, the formations may be in the form of discrete circumferentially extending teeth which stand proud of the internal surface of the collar, as have been used in shape memory alloy collars.

The force which is exerted radially inwardly by a shape memory alloy collar when it shrinks is dependent on, amongst other things, the wall thickness of the collar. It is, however, desirable to minimize the wall thickness of the collar so that the assembly used to make the connection to the object occupies as little space as possible.

SUMMARY OF THE INVENTION

We have devised a technique for forming a connection to an object using a shape memory alloy collar in which one formation bites into the external surface of the object as a result of the forces exerted on shrinkage of the collar, and another formation bites into the surface of the object through mechanical deformation of the collar.

Accordingly, in one aspect, the invention provides a method of forming a mechanical connection to an object, which comprises:

(a) positioning around the object a collar formed from a shape memory alloy, the collar having a groove formed in its internal surface, the groove being defined longitudinally by two radially extending circumferential formations;

(b) increasing the temperature of the collar to a temperature above the $A_s$ temperature of the alloy to cause at least a portion of the collar to shrink radially so that a first one of the formations bites into the surface of the object; and (c) mechanically deforming at least a portion of the collar radially inwardly so as to cause the second formation to bite into the surface of the object.

The invention also provides assemblies for use in the method of the invention, and objects to which mechanical connections have been made using the method of the invention. A preferred assembly comprises:

(a) a collar formed from a shape memory alloy and having a groove formed in its internal surface, the groove being defined longitudinally by two radially extending circumferential formations;

(b) means for mechanically deforming at least a portion of the collar radially inwardly.

DESCRIPTION OF THE INVENTION

The method of the invention has the advantages of a shape memory alloy collar of requiring less time and less skill on the part of the installer to affix it to the object accurately and in a controlled manner, compared with collars that are affixed by swaging. Once the collar has been affixed to the pipe by increasing its temperature to above the $A_f$ temperature of the alloy, causing one of the formations to bite into the surface of the object, the seal between the collar and the object can be optimized by mechanically deforming at least a portion of the collar radially inwardly to cause the other of the formations to bite into the surface of the object, and to force a circumferential portion of the object into the groove in the collar. The amount of time and skill required to deform the collar mechanically after it has been affixed by shrinkage of the collar is small compared with that necessary to make a swaged connection between an object and a collar which is not formed from shape memory alloy.

Generally, the collar will shrink radially in the vicinity of the second formation, so that the formation is in contact with the surface of the object, although it will generally not be caused to bite into the surface of the object to the desired extent. While this partial shrinkage of the collar does not result in the desired seal between the collar and the object, it does make the subsequent step of deforming the collar very much easier, facilitating formation of the desired seal between the collar and the object in that deformation step. This can be contrasted with connections formed by swaging, which generally are made only to hollow objects because it is much more convenient and efficient to form the connection by expanding the object rather than by compressing the collar. Thus the method of the present invention can be applied equally to hollow objects such as tubes and to solid objects such as rods.

The nature of the deformation which is applied to the collar after it has shrunk is such that complicated swaging equipment, requiring a high level of skill for its operation, is not required. Preferably the collar is deformed inwardly by drawing a tubular sleeve axially over it. For example, in the region of contact between the collar and the sleeve, the sleeve may be tapered internally, or the collar may be tapered externally, or more preferably both. For example, when the collar is tapered externally, the taper will preferably extend over the region which includes the second formation, and the external dimension of the collar will decrease towards the end of the collar from which the sleeve is drawn in the deformation step.

Preferably, the contacting surfaces of the collar and the sleeve are so configured that a seal is formed between them. For example, one of the contacting surfaces may be convex at the point of contact, and the other surface linear, when viewed in cross-section. More preferably, the seal is enhanced by resilience of the deformation of the collar and the object.

While retaining the advantages discussed above of connections made using a shape memory alloy collar, the connection technique of the present invention has the additional advantage that the seal obtained between the collar and an object to which it is affixed is superior to that obtained using previously known shape memory alloy collars. For a single size of object, such as a tube, the invention allows a connection to be made to the object with a stronger seal, without increasing the transverse dimensions of the collar. On the other hand, the invention allows a connection to be made with similar seal characteristics using a collar with smaller transverse dimensions. This can be particularly advantageous when the space occupied by the collar is restricted, for example, by other components which cooperate with the collar to make the connections.

The sleeve may be a component of a coupling assembly for joining two objects to one another, being attached, or being suitable for attachment, to another object. For example, it may be a union member in a tube coupling of the type disclosed in U.S. Pat. No. 3,484,123.

The sleeve may be provided with a screw thread, so that it can be drawn axially over the collar by engaging the screw thread with a cooperating thread on another component, and causing the component to rotate relative to the sleeve.

Preferably the said other component is a ring which has an axially facing surface on the collar so that, when the collar grips the object, preferably with both formations biting into the surface of the pipe, an axial force can be applied to the object through the collar by means of the ring. The cooperating axially facing surfaces on the collar and the ring may, but need not, be perpendicular to the axis of the object to be connected. Arranging the surfaces so that they are substantially perpendicular to the axis allows the axial force applied to the object through the ring and the collar. However, arranging the surfaces so that they are not perpendicular allows a force to be applied through the ring to force the collar against the object, which can enhance the seal between the collar and the object and can therefore be advantageous for many applications.

Preferably, the wall thickness of the collar in the vicinity of the first formation is greater than the wall thickness in the vicinity of the second formation. For example, the wall thickness in the vicinity of the second formation may be less than about 50%, more preferably less than about 40%, especially less than about 30%, of the wall thickness in the vicinity of the first formation. The increased wall thickness in the vicinity of the first formation may provide the axially facing surface for cooperation with an axially facing surface on a ring as discussed above.

The collar may be provided with more than one groove in its internal surface. The or each groove is defined by a pair of radially extending circumferential formations. One or more of the formations may be the end walls of the groove which is formed in the otherwise uniform internal surface of the collar. One or more of the formations may be in the form of a discrete circumferentially extending tooth which stands proud of the internal surface of the collar. Such a tooth will generally be machined, or otherwise formed integrally, in the internal surface of the collar. However, such a tooth may be provided as a ring which is formed separately from the collar, and is subsequently positioned inside the collar. One or both of the formations which define each groove may be in the form of a tooth, and in addition, such a groove may be recessed below the internal surface of the collar.

The properties of the seal between the collar and the object can be selected by varying one or more of the nature of the formations, the shape of the or each tooth (when one or more formations is in the form of a tooth), the spacing between the formations, the wall thickness of the collar in the vicinity of each of the formations, and the shape of the groove in the collar (when the collar is viewed in the cross-section). The seal may also be affected by the nature of the material of the object, in particular its hardness and flexibility, and by the force which is exerted by the collar during heat-shrinkage (which can be affected by the process by which the collar is formed), and during mechanical deformation (which can be affected by the nature of the deformation step).

The shape memory alloy from which the collar is formed is required to be capable of transforming between martensitic and austenitic phases. The alloy will be selected according to the temperatures to which the collar will be exposed before, during and after installation, and to the physical requirements placed on the collar when in use. The alloy may be based on copper, for example as disclosed in U.S. Pat. No. 4,144,057 or U.S. Pat. No. 4,144,104, or more preferably on nickel-titanium, for example as disclosed in U.S. Pat. No. 3,753,700, U.S. Pat. No. 4,337,090, U.S. Pat. No. 4,565,589 or U.S. Pat. No. 4,770,725. A preferred method of treatment of a nickel-titanium based shape memory alloy is disclosed in U.S. Pat. No. 4,740,253. The subject matter disclosed in these documents is incorporated herein by these references to the documents.

Shrinkage of the collar can be achieved by heating it to a temperature above the $A_s$ temperature of the alloy. Preferably, however, the collar is heated to a temperature above the $A_f$ temperature of the alloy, at which temperature shrinkage of the collar will be complete.

The thermal transformation hysteresis loop of certain shape memory alloys, particularly certain nickel-titanium based alloys, is such that the alloys must be stored at temperatures significantly below ambient temperature to prevent transformation from the martensitic phase to the austenitic phase, with attendant change in configuration. This is generally achieved by submerging the alloy in liquid nitrogen.

The shape memory alloy collar may be provided as a component of an assembly which also includes (a) a ring having an axially facing surface for cooperation with the axially facing surface on the collar so that, when the collar has been treated to cause it to shrink to grip the object, an axial force can be applied to the object through the collar means of the ring, and (b) a device which releasably engages the ring and the collar so as to hold the ring and the collar coaxially with respect to one another. The device may be closed at one end, which can locate the assembly axially with respect to the object, and can prevent ingress of foreign particles into the object (when hollow), during a period between fixing the collar on the object and forming a connection to the object via the collar. Such an assembly, together with methods of forming mechanical connections to an object, and objects to which mechanical connections have been made, invented by Michael Kapgan and Peter Brooks, is disclosed in U.S. Pat. No. 07/307382 filed Feb. 7, 1989, entitled Assembly for forming a mechanical connection to an object. The subject matter disclosed in that document is incorporated herein by this reference to the document.

BRIEF INTRODUCTION TO THE DRAWINGS

FIG. 1 is a sectional elevation through a collar for use in the method of the invention;

FIG. 2 is a sectional elevation through the collar shown in FIG. 1, after it has been heated to cause it to shrink into contact with the external surface of a tube;

FIG. 3 is a sectional elevation through the collar and tube shown in FIG. 2, after the collar has been deformed mechanically by drawing a sleeve over it.

DESCRIPTION OF A PREFERRED EMBODIMENT

FIG. 1 shows a shape memory alloy collar 2. Preferably the collar is formed from a nickel-titanium based shape memory alloy, such as a nickel-titanium-iron alloy as disclosed in U.S. Pat. No. 3,753,700, or a nickel-titanium-niobium iron as disclosed in U.S. Pat. No. 4,770,725. A groove 4 is formed in the internal surface of the collar. The groove is define longitudinally by a pair of teeth 6, 8, which extend radially inwardly from the surface of the collar and which are tapered towards their tips. The wall thickness of a portion 10 collar in the vicinity of the first one 6 of the teeth is greater than the wall thickness in the vicinity of the second tooth 8. The wide portion 10 of the collar is defined by an axially facing surface 12.

The end 14 of the collar proximal to the second tooth is bevelled, at least on the external surface of the collar.

For use on a titanium tube having an external diameter of 125 mm and a wall thickness of 1.25 mm, the collar has an internal diameter, measured after unrestrained recovery of about 24.5 mm. The height of each tooth is about 125 micrometers and the teeth are about 2.5 mm apart. The wall thickness of the collar in the vicinity of the first tooth (not including the height of the tooth) is about 2.5 mm, and in the vicinity of the second tooth is about 0.75 mm. The length of the widened portion of the collar in the vicinity of the first tooth is about 6.5 mm.

FIG. 2 shows the collar 2 with a tube 20 inserted into it. The collar is shown after its temperature has been increased to above the $A_f$ temperature of the alloy. When the $A_s$ temperature of the alloy is below ambient temperature (as is generally the case with the nickel-titanium-iron alloy referred to above) so that the collar is stored before installation in an appropriate fluid such as liquid nitrogen, its temperature may be increased simply by removing it from the liquid nitrogen. Increasing the temperature of the alloy in this way causes the collar to shrink radially. The force exerted by the wide portion 10 of the collar in the vicinity of the first tooth 6 causes that tooth to deform and to bite into the external surface of the tube 20. The force exerted by the narrower portion of the collar in the vicinity of the second tooth is insufficient to cause that tooth also to bite into the surface of the tube.

FIG. 3 shows the collar 2 after it has been deformed mechanically in the vicinity of the second tooth 8 so that tooth bites into the external surface of the tube. The collar is deformed in this way by means of a sleeve 22 which is drawn axially over the collar. The sleeve is tapered internally in the region of contact between it and the end 14 of the collar. The sleeve has a screw thread 24 formed in its external surface.

The sleeve 22 may be a union member in a coupling of the type disclosed in U.S. Pat. No. 3,484,123.

The sleeve 22 is drawn over the collar 2 by means of a ring 26. The ring has a screw thread 28 formed in its internal surface for engaging the screw thread 26 formed in the external surface of the sleeve. The ring has an axially facing surface 12 defining the wide portion 10 of the collar, so that once the collar 2 has been affixed to the tube 20 by shrinkage of the collar, causing the first tooth 6 to bite into the tube, an axial force can be applied to the tube through the collar by means of the ring.

Rotation of the ring 26 relative to the sleeve 22 causes the sleeve to be drawn axially over the end 14 of the collar, deforming that end of the collar radially inwardly and causing the second tooth 8 to bite into the external surface of the tube. The tube is thus forced into the groove 4 which is defined longitudinally by the first and second teeth.

The ring or the sleeve or both may be provided with flats or textured surfaces to allow them to be gripped for rotation.

The contacting surfaces of the sleeve and the collar, are so configured that a seal is formed between them, so that a fluid-tight connection can be made between the tube 20 and the sleeve 22, through the collar 2. Thus the surface of the sleeve is linear and the surface of the collar is convex, when viewed in cross-section. A similar connection may be made between the sleeve at its other end and another tube.

What is claimed is:

1. A method of forming a mechanical connection to an object, which comprises:
    (a) positioning around the object a collar formed from a shape memory alloy, the collar having a groove formed in its internal surface, the groove being defined longitudinally by two radially extending circumferential formations;
    (b) increasing the temperature of the collar to a temperature above the $A_s$ temperature of the alloy to cause at least a portion of the collar to shrink radially so that a first one of the formations bites into the surface of the object; and
    (c) mechanically deforming at least a portion of the collar radially inwardly so as to cause the second formation to bite into the surface of the object.

2. A method as claimed in claim 1, in which the second formation is located towards an end of the collar.

3. A method as claimed in claim 1, in which at least one of the formations is in the form of a tooth.

4. A method as claimed in claim 1, in which the collar is deformed inwardly by drawing a tubular sleeve axially over the collar.

5. A method as claimed in claim 4, in which at least one of the sleeve and collar is tapered at least in the region of contact between the collar and the sleeve.

6. A method as claimed in claim 4, in which the sleeve is provided with a screw thread, and it is drawn axially over the collar by engaging the said screw thread with a cooperating thread on another component, and causing the component to rotate relative to the sleeve.

7. A method as claimed in claim 6, in which the said other component is a ring which has an axially facing surface for cooperation with an axially facing surface on the collar so that, when the collar grips the object, an axial-force can be applied to the object through the collar by means of the ring.

8. A method as claimed in claim 1, in which the wall thickness of the collar in the vicinity of the second formation is less than the wall thickness in the vicinity of the first formation.

9. A method as claimed in claim 8, in which the wall thickness in the vicinity of the second formation is less than about 40% of the wall thickness in the vicinity of the first formation.

10. An assembly for forming a mechanical connection to an object which comprises:
    (a) a collar formed from a shape memory alloy and having a groove formed in its internal surface, the groove being defined longitudinally by two radially extending circumferential formations;
    (b) means for mechanically deforming at least a portion of the collar radially inwardly.

11. An assembly as claimed in claim 10, in which the deforming means comprises a tubular sleeve which is drawn axially over the collar in order to deform the collar.

12. An assembly as claimed in claim 11, in which the sleeve is provided with a screw thread, and the deforming means includes a component with a cooperating screw thread, so that the sleeve can be drawn axially over the collar by engaging the cooperating screw threads with one another, and causing the component to rotate relative to the sleeve.

13. An assembly as claimed in claim 12, in which the collar has an axially facing surface and the said component is a ring which has an axially facing surface for cooperation with the axially facing surface on the collar so that, when the collar grips the object, an axial force can be applied to the object through the collar by means of the ring.

14. An assembly as claimed in claim 10, in which the wall thickness of the collar in the vicinity of a first one of the formations is greater than the wall thickness in the vicinity of the second formation.

15. An assembly as claimed in claim 14, in which the wall thickness in the vicinity of the second formation is less than about 40% of the wall thickness in the vicinity of the first formation.

* * * * *

UNITED STATES PATENT AND TRADEMARK OFFICE
CERTIFICATE OF CORRECTION

PATENT NO. : 5,058,936
DATED : October 22, 1991
INVENTOR(S) : Kapgan, et al.

It is certified that error appears in the above-indentified patent and that said Letters Patent is hereby corrected as shown below:

On title page, item [54] & col.1, "METHOD OF FORMING A MECHANICAL CONNECTION TO AN OBJECT".

Column 6, line 52, after "thread" delete "26" and insert therefor --24--.

Column 6, line 54, after "facing surface" insert --30 that engages the axially facing surface--.

Signed and Sealed this

Thirty-first Day of October 1995

Attest:

BRUCE LEHMAN

Attesting Officer

Commissioner of Patents and Trademarks